US012794814B1

(12) United States Patent
Kit et al.

(10) Patent No.: US 12,794,814 B1
(45) Date of Patent: Nov. 10, 2026

(54) METHODS FOR INCREASING RELEVANT DATA FLOWS AND DEVICES THEREOF

(71) Applicant: F5, Inc., Seattle, WA (US)

(72) Inventors: Dmitry M. Kit, Marietta, GA (US); Kevin W. Baughman, Natick, MA (US); Joseph Daniel Baker, Amherst, NH (US); Laurent Querel, Gilroy, CA (US)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 19/190,020

(22) Filed: Apr. 25, 2025

(51) Int. Cl.
*H04L 47/24* (2022.01)
*H04L 47/10* (2022.01)

(52) U.S. Cl.
CPC .............. *H04L 47/24* (2013.01); *H04L 47/15* (2013.01)

(58) Field of Classification Search
CPC ................................ H04L 47/24; H04L 47/15
See application file for complete search history.

(56) References Cited

U.S. PATENT DOCUMENTS

2026/0074947 A1* 3/2026 Ramadass ........... H04L 41/0631
2026/0105082 A1* 4/2026 Xie ..................... G06F 16/3329

OTHER PUBLICATIONS https://aigateway.clouddocs.f5.com/processors/system-prompt.html.
https://www.f5.com/resources/articles/ai-gateway-overview.
https://www.f5.com/resources/white-papers/policy-in-payload-preparing-for-ai-agent-architectures.
https://aigateway.clouddocs.f5.com/overview.html.
https://www.f5.com/company/blog/put-control-and-security-where-your-ai-applications-are.
https://my.f5.com/manage/s/article/K000149560.

* cited by examiner

*Primary Examiner* — Soe Hlaing
(74) *Attorney, Agent, or Firm* — Troutman Pepper Locke LLP

(57) ABSTRACT

A method, system, and non-transitory computer readable medium includes determining whether current distributions of dropped data from a client device conform with historical trends. In response to determining the current distributions of the dropped data do not conform with historical trends, the method further includes generating a prompt comprising rules and distributions and providing, to a large language model, the prompt. The large language model can be configured to modify a rule set based on the prompt. Then, the method can include receiving and providing, from the large language model to a client device, the modified rule set. The method can then further include filtering data of the client device using the modified rule set and providing the filtered data to a cloud service for downstream processing.

20 Claims, 9 Drawing Sheets

METHODS FOR INCREASING RELEVANT DATA FLOWS AND DEVICES THEREOF

FIELD

This technology generally relates to increasing relevant data flows and, more particularly, to methods for increasing relevant data flows, reducing irrelevant data flows, and managing costs related to data transfers and devices thereof.

BACKGROUND

Traditional methods of managing vast amounts of data collected from edge devices often involve applying static logical filters to exclude data presumed to be non-essential before sending the data to cloud services for further analysis. The data is usually filtered because the volume of data is usually large, and transporting the data to the cloud for computational processing is costly and a challenge. These logical filters can be based on predefined criteria. In one non-limiting example, these logical filters can be configured to exclude events labeled as "information" or data from sources tagged as "demo." However, using static logical filters is inherently flawed due to its reliance on fixed assumptions about the relevance of the data. For example, while information-type events are typically filtered out, an unexpected increase in such events from a critical database server could indicate a significant issue that needs attention. The rigidity of these logical filters means that potentially important data may be overlooked, leading to gaps in insights and delayed responses to emerging problems. This static filtering method fails to adapt to the dynamic nature of data, thereby compromising the ability of the system to maintain optimal performance and security. Additionally, these logical filters are rarely revisited, and there is limited visibility to verify whether the assumptions behind them remain relevant. Most systems lack the necessary visibility because the data required for analysis is typically dropped by the system and thus becomes unavailable. Currently, traditional methods for diagnosing problems and detecting attacks of a system are not efficient. The traditional methods also do not reduce task irrelevant information and do not effectively manage the costs introduced by data transfers.

Therefore, a system that is configured to increase the gain on data flows that are important for a particular goal while reducing gain on irrelevant data flows unrelated to the task is needed. Furthermore, a system that can increase relevant data flows, while also managing the costs related to transferring data and avoid overwhelming the user is needed. The present disclosure can detect what data is important for diagnosing problems and detect attacks of a system and which can dynamically optimize data volumes such that important data is delivered timely.

SUMMARY

A method that can detect and summarize data using artificial intelligence includes determining whether current distributions of dropped data from a client device conform with historical trends. In response to determining the current distributions of the dropped data do not conform with historical trends, the method further includes generating a prompt comprising rules and distributions and providing, to a large language model, the prompt. The large language model can be configured to modify a rule set based on the prompt. Then, the method can include receiving and providing, from the large language model to a client device, the modified rule set. The method can then further include filtering data of the client device using the modified rule set and providing the filtered data to a cloud service for downstream processing.

A non-transitory computer readable medium having stored thereon instructions comprising machine executable code which when executed by at least one processor, causes the processor to determine whether current distributions of dropped data from a client device conform with historical trends. In response to determining the current distributions of the dropped data do not conform with historical trends, the executable code which when executed by at least one processor, causes the processor to generate a prompt comprising rules and distributions and providing, to a large language model, the prompt. The large language model can be configured to modify a rule set based on the prompt. Then, the executable code which when executed by at least one processor, can further cause the processor to receive and provide, from the large language model to a client device, the modified rule set. The executable code which when executed by at least one processor, can further cause the processor to filter data of the client device using the modified rule set and provide the filtered data to a cloud service for downstream processing.

A computing apparatus including at least one of configurable hardware logic configured to be capable of implementing or a processor coupled to a memory and configured to execute programmed instructions stored in the memory to determine whether current distributions of dropped data from a client device conform with historical trends. In response to determining the current distributions of the dropped data do not conform with historical trends, the programmed instructions which when executed by at least one processor, causes the processor to generate a prompt comprising rules and distributions and providing, to a large language model, the prompt. The large language model can be configured to modify a rule set based on the prompt. Then, the programmed instructions which when executed by at least one processor, can further cause the processor to receive and provide, from the large language model to a client device, the modified rule set. The programmed instructions which when executed by at least one processor, can further cause the processor to filter data of the client device using the modified rule set and provide the filtered data to a cloud service for downstream processing.

A network traffic management system including at least memory comprising programmed instructions and one or more processors configured to determine whether current distributions of dropped data from a client device conform with historical trends. In response to determining the current distributions of the dropped data do not conform with historical trends, the programmed instructions which when executed by at least one processor, causes the processor to generate a prompt comprising rules and distributions and providing, to a large language model, the prompt. The large language model can be configured to modify a rule set based on the prompt. Then, the programmed instructions which when executed by at least one processor, can further cause the processor to receive and provide, from the large language model to a client device, the modified rule set. The programmed instructions which when executed by at least one processor, can further cause the processor to filter data of the client device using the modified rule set and provide the filtered data to a cloud service for downstream processing.

This technology provides a number of advantages, including offering a method, non-transitory computer-readable medium, and apparatus that enable the dynamic adjustment of data summation and filtering. By leveraging a large language model (LLM) to modify, remove, and add new summation or filtering rules, the system ensures that only relevant data is sent to cloud services for further processing. This approach significantly reduces the volume of data transmitted, thereby lowering transfer and compute costs. Moreover, the ability of the system to dynamically adapt to deviations in patterns ensures that important information is not inadvertently filtered out, enhancing the accuracy and reliability of the insights generated. This innovative method minimizes the risk of missing critical events, which could otherwise be overlooked due to static filtering rules.

Additionally, the use of short-term storage and periodic aggregation of dropped data allows for a comprehensive analysis of data patterns before making any filtering adjustments. The short-term storage of data also allows visibility into the relevant and effectiveness of current rules, unlike in traditional systems that drop data. By comparing current data distributions with previously observed distributions, the system can detect significant deviations and prompt the LLM to generate appropriate filtering rules. This iterative process ensures that the filtering method remains responsive to changing data patterns, thereby maintaining the integrity and relevance of the data sent to the cloud. The ability for users to influence the output of the LLM through natural language descriptions of the infrastructure and user concerns further enhances the adaptability and user-friendliness of the system. Overall, the disclosed technology streamlines data management, improves the efficiency of cloud processing, and ensures that critical data is not lost, making the disclosed technology a valuable tool for real-time data analysis and decision-making.

BRIEF DESCRIPTION OF THE DRAWINGS

FIGS. 4A-1 and 4A-2 are exemplary flowcharts of a process by the filtering computing system;

DETAILED DESCRIPTION

Figure 1:
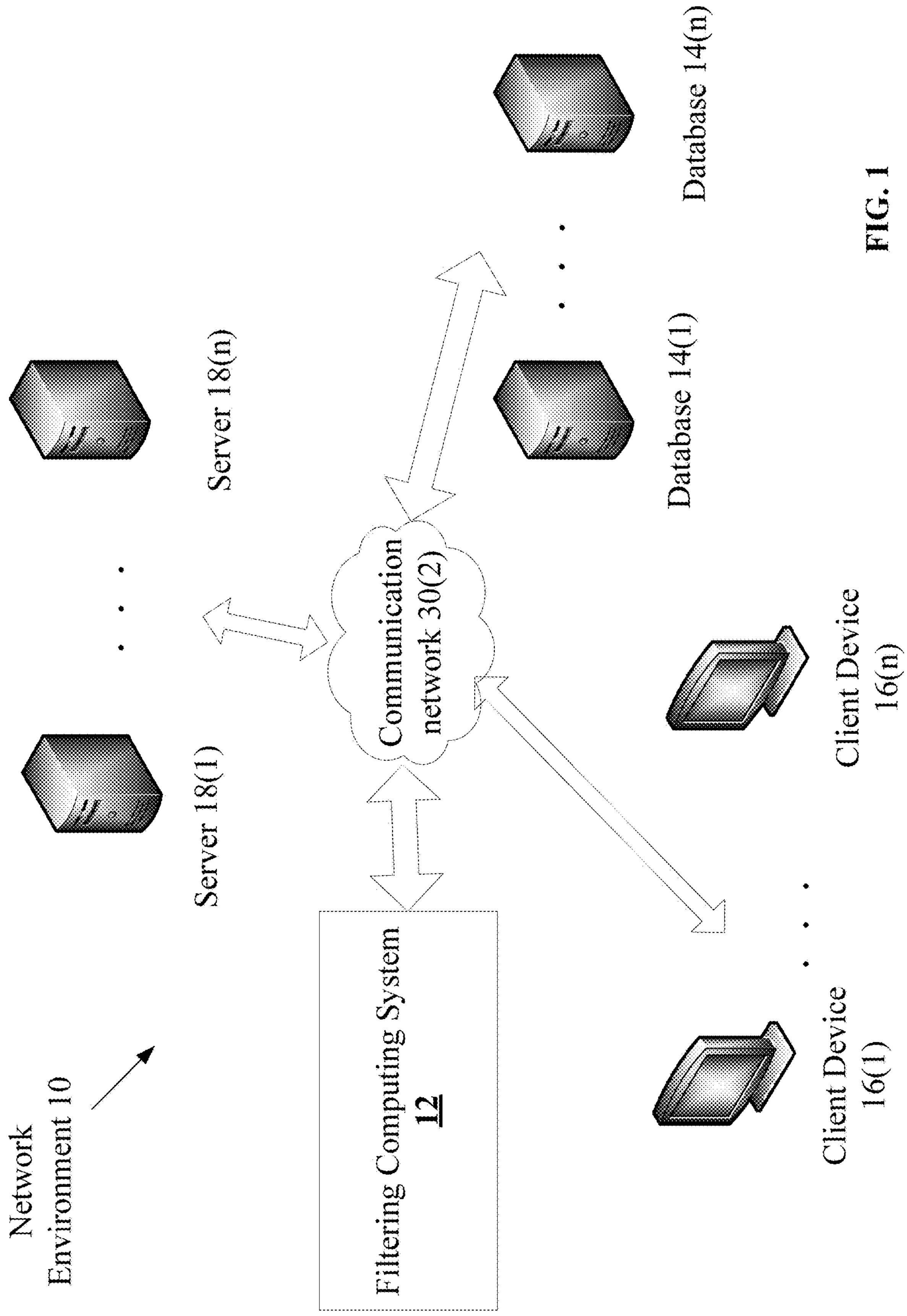
FIG. 1 is a block diagram of an example of an environment with a filtering computing system.
Figure 2A:
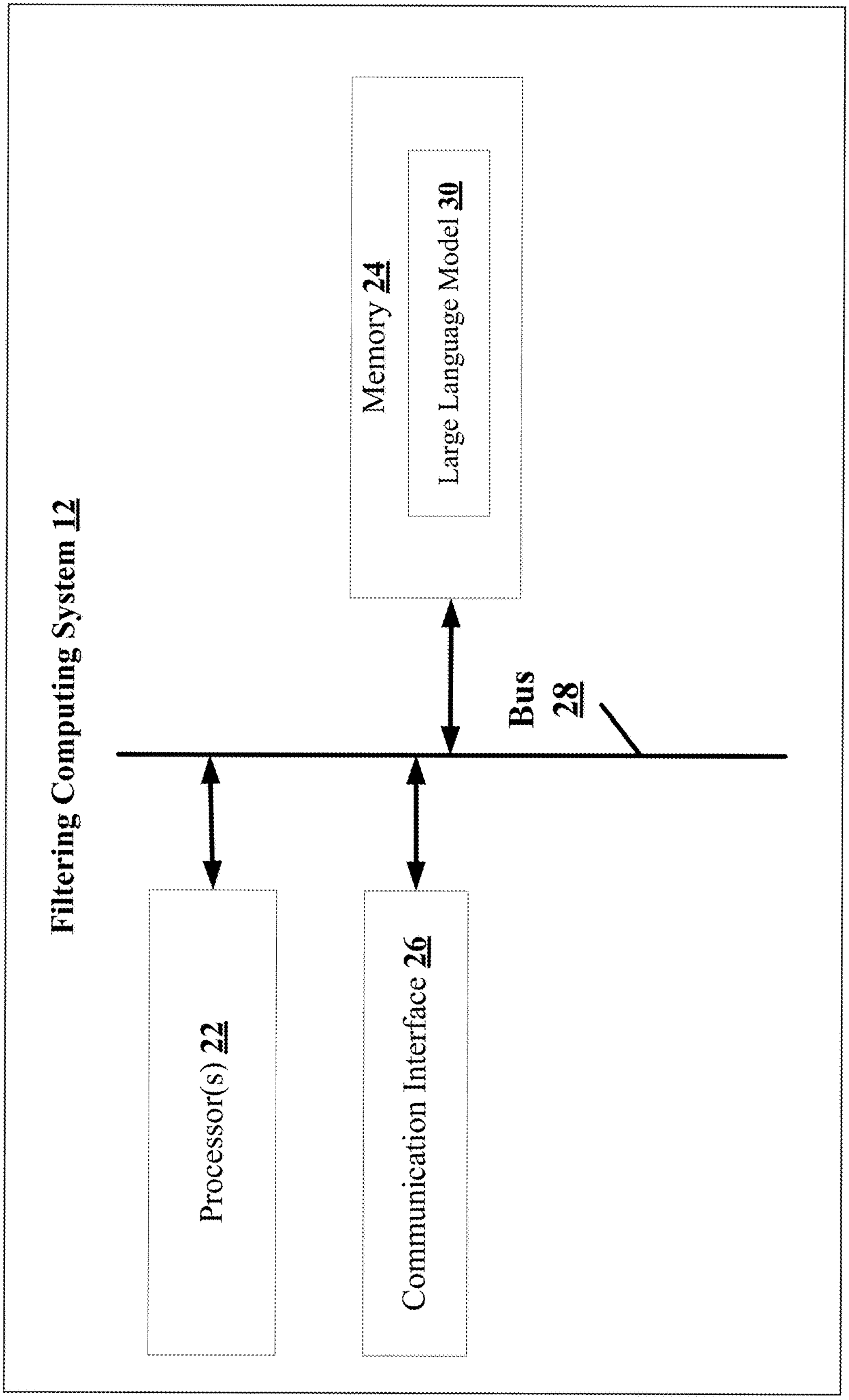
FIG. 2A is a block diagram illustrating an example of an architecture of a filtering computing system.
Figures 1, 4A:
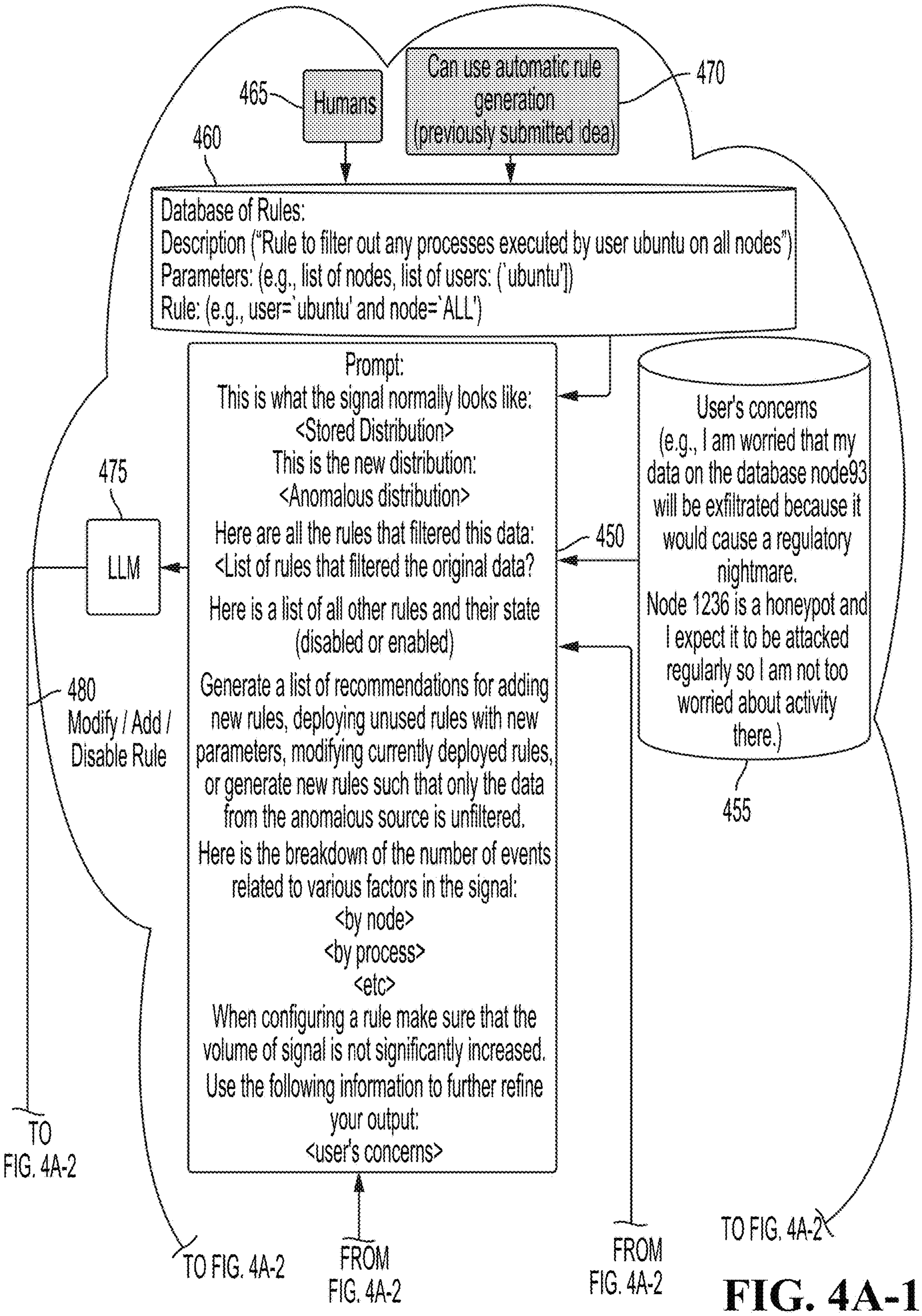
Figures 2, 4A:
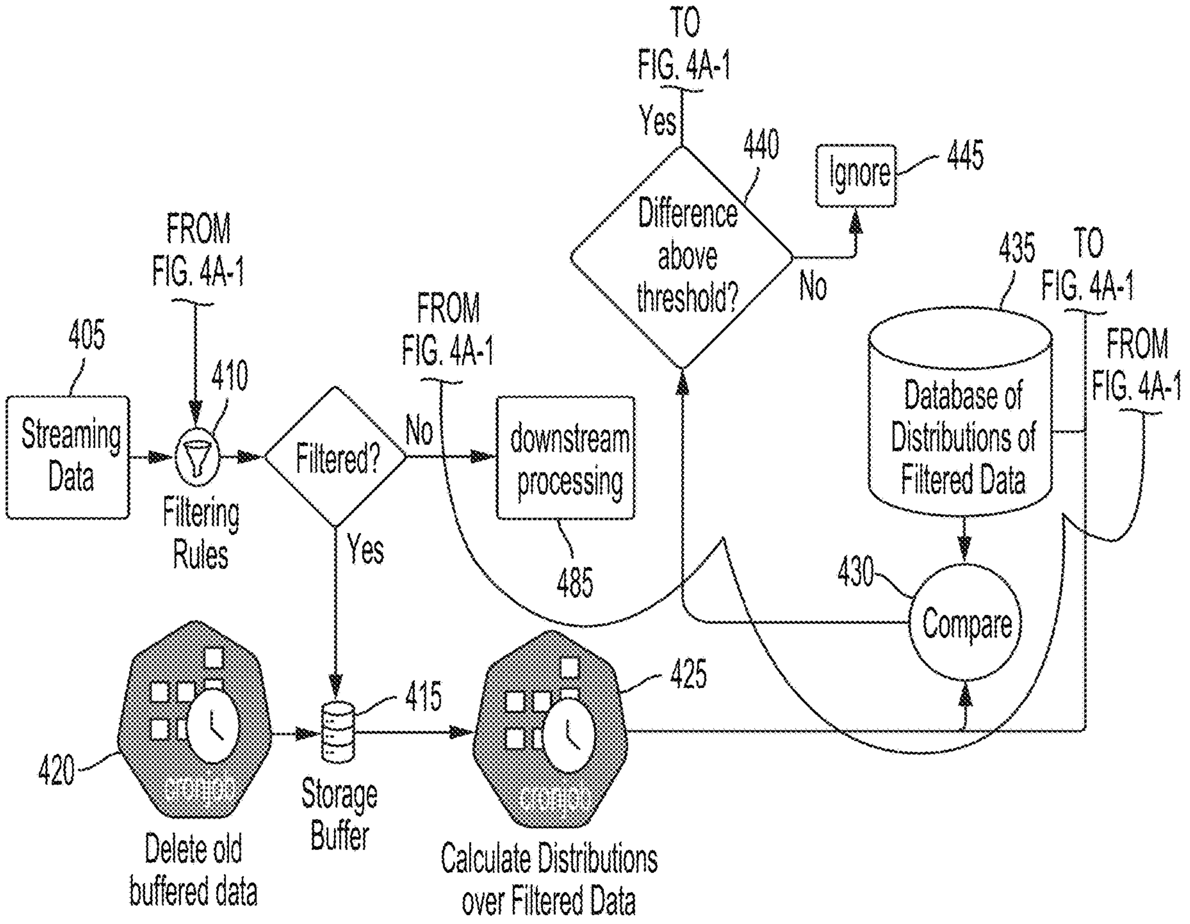
Figure 4B:
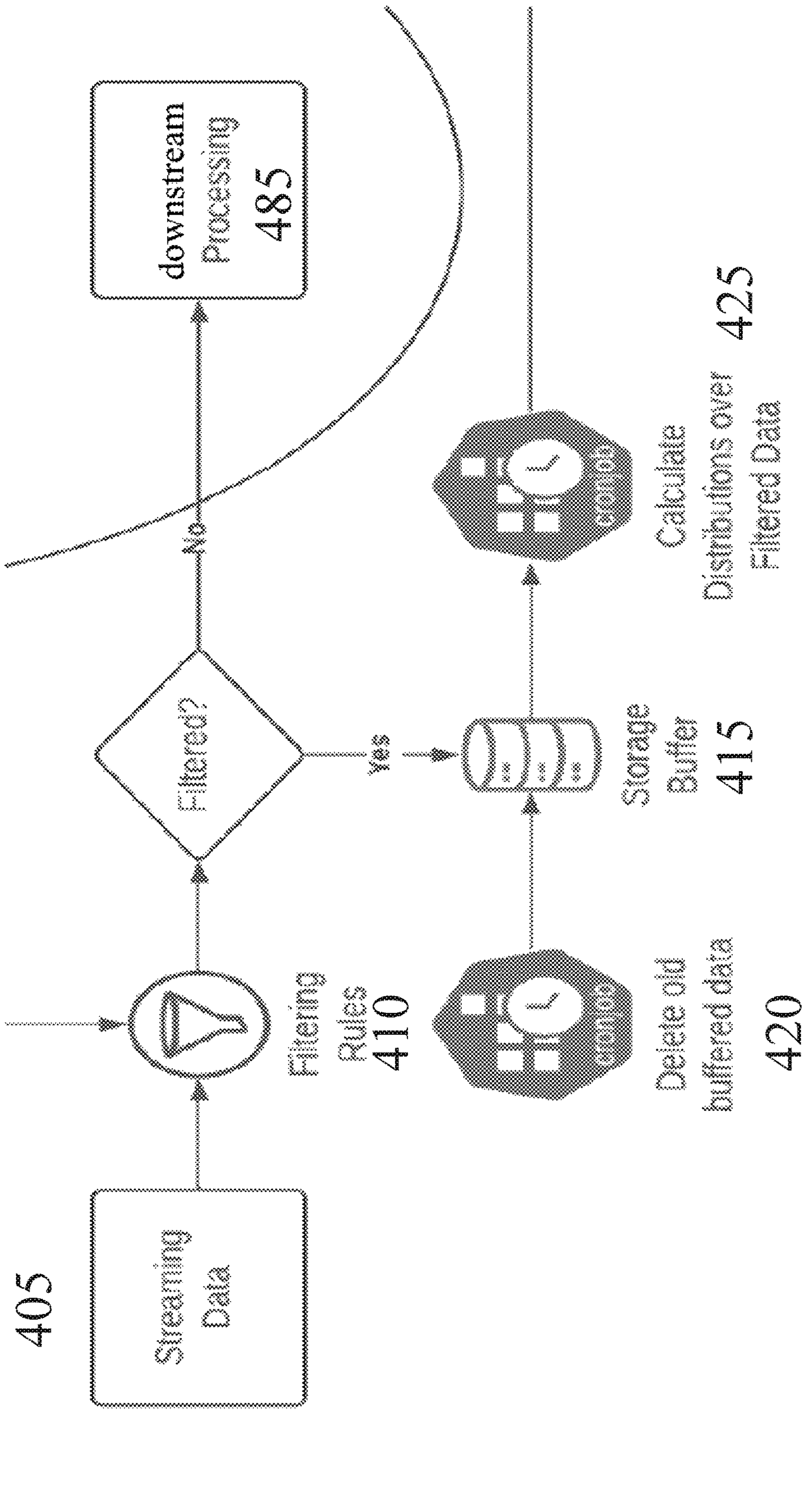
FIG. 4B is an exemplary flowchart of an enlarged section of the process depicted in FIG. 4A, providing a more detailed view of specific steps within the process generated by the filtering computing system.
Figure 4C:
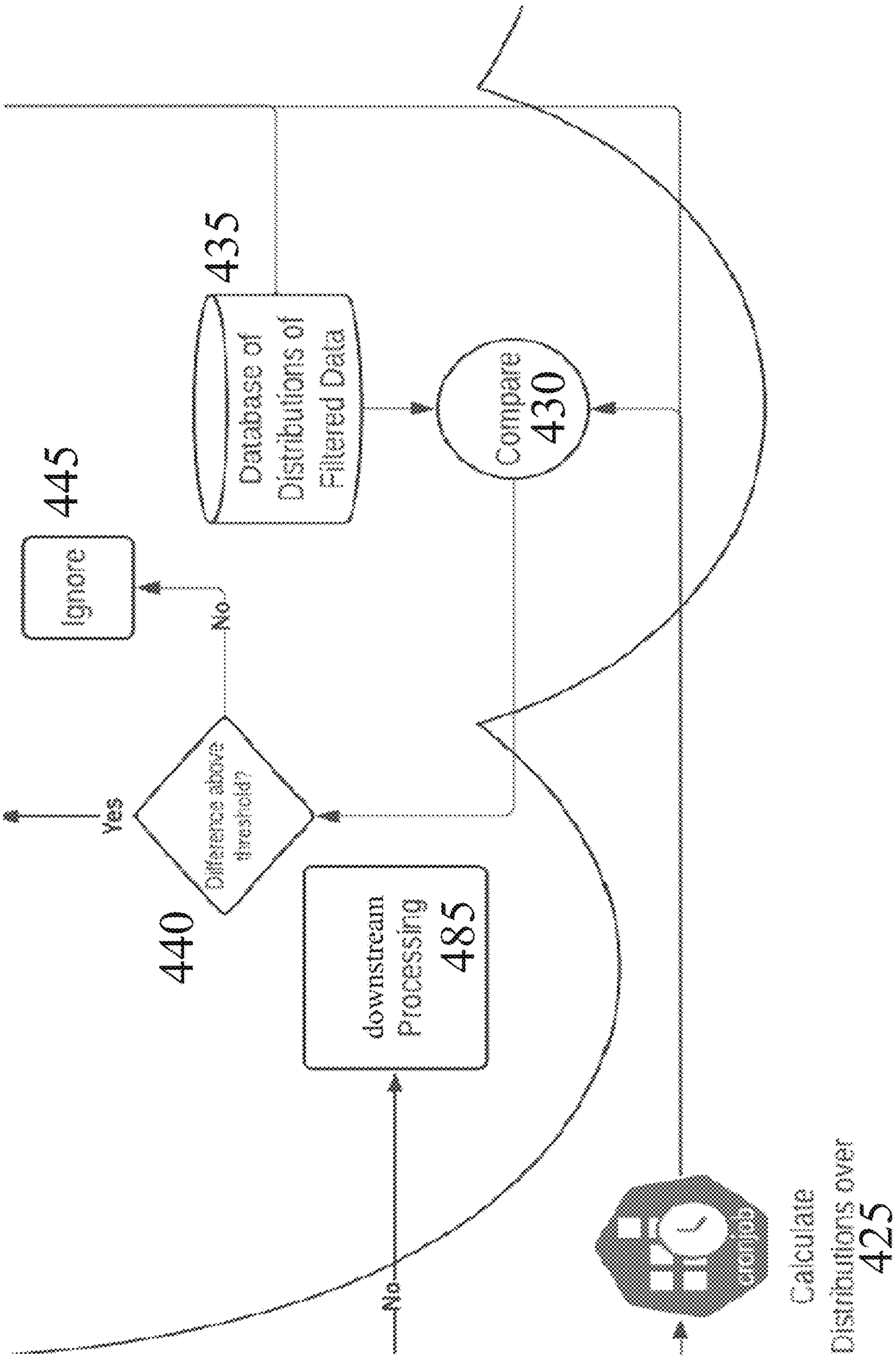
FIG. 4C is an exemplary flowchart of an enlarged section of the process depicted in FIG. 4A, providing a more detailed view of specific steps within the process generated by the filtering computing system.
Figure 4D:
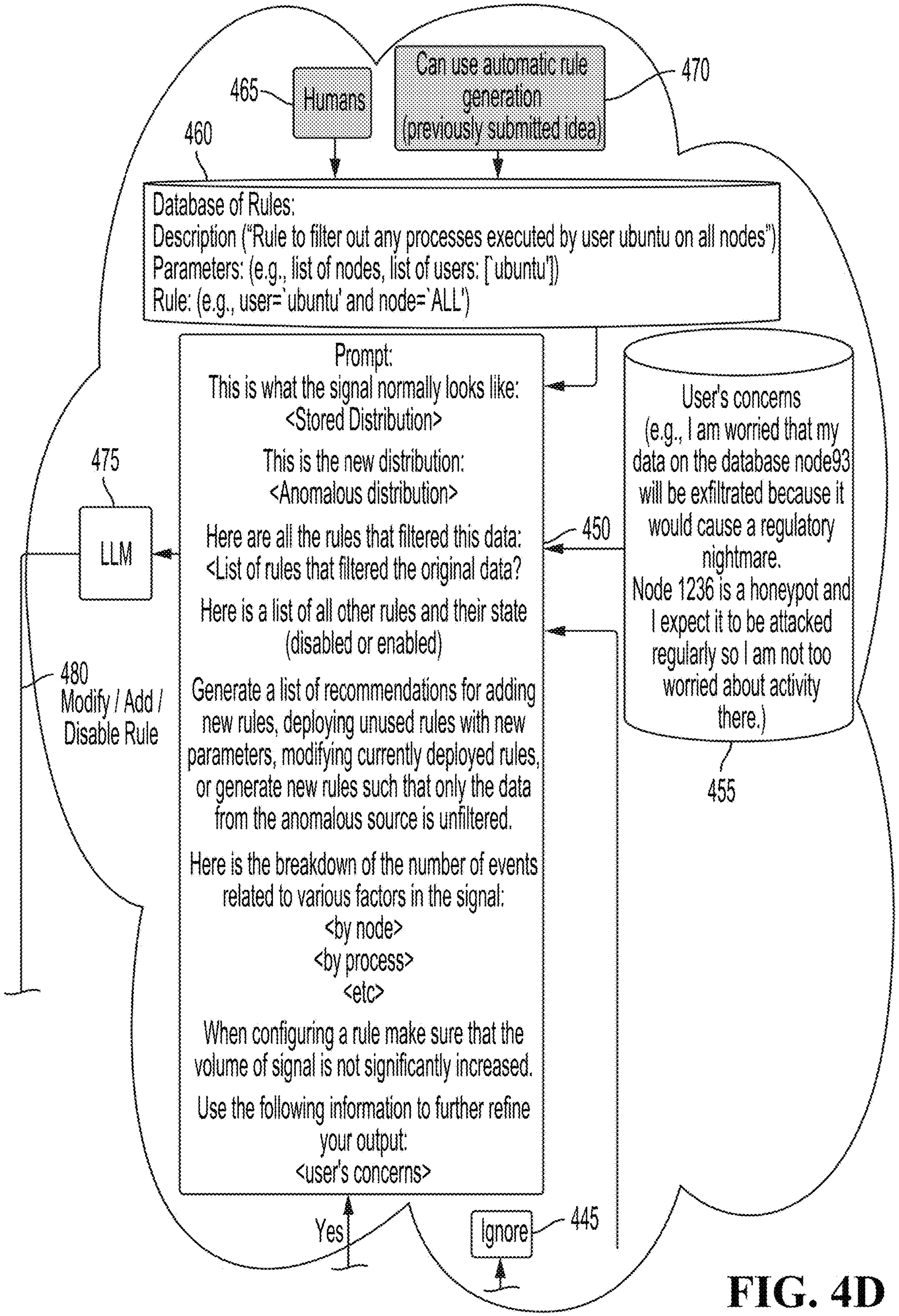
FIG. 4D is an exemplary flowchart of an enlarged section of the process depicted in FIG. 4A, providing a more detailed view of specific steps within the process generated by the filtering computing system.

An environment 10 with an exemplary filtering computing system 12 is shown in FIGS. 1-2A. In this example, the environment 10 includes the filtering computing system 12, a plurality of databases 14(1)-14(*n*), a plurality of client devices 16(1)-16(*n*), and a plurality of servers 18(1)-18(*n*), although the environment may comprise other types and/or numbers of other systems, devices, components, and/or other elements in other configurations. This technology provides a number of advantages including providing systems, methods, and non-transitory computer readable media that provide effective methods for the detecting and summarizing of data.

Referring to more specifically to FIGS. 1-2A, in this example, the filtering computing system 12 includes one or more processor(s) 22, a memory 24, and/or a communication interface 26, which are coupled together by a bus or other communication link 28, although the filtering computing system 12 can include other types and/or numbers of elements in other configurations.

The processor(s) 22 of the filtering computing system 12 may execute programmed instructions stored in the memory of the filtering computing system 12 for any number of functions and other operations as illustrated and described by way of the examples herein. The processor(s) 22 of the filtering computing system 12 may include one or more CPUs or general purpose processors with one or more processing cores, for example, although other types of processor(s) can also be used.

The memory 24 of the filtering computing system 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 24.

Accordingly, the memory 24 of the filtering computing system 12 can store one or more applications that can include computer executable instructions that, when executed by the filtering computing system 12, cause the filtering computing system 12 to perform actions, such as to detect data or generate rules in the environment 10, and other actions as described and illustrated in the examples below with reference to FIGS. 1-4D. The application(s) can be implemented as modules, programmed instructions, or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the filtering computing system 12 itself, may be located in virtual server(s) running in a cloud-based computing environment rather than being tied to one or more specific physical computing devices. Also, the application(s) may be running in one or more virtual machines (VMs) executing on the filtering computing system 12. Additionally, in one or more embodiments of this technology, virtual machine(s) running on the filtering computing system 12 may be managed or supervised by a hypervisor.

In this particular example, the memory 24 of the filtering computing system 12 may include a large language model 30 which may be executed as illustrated and described by way of the examples herein, although the memory 24 can for example include other types and/or numbers of modules, platforms, algorithms, programmed instructions, applications, or databases for implementing examples of this technology.

The large language model 30 may be a large language model (LLM) 30. The LLM 30 can be configured to perform a wide range of natural language processing tasks, including answering questions, generating text or rules, and engaging in conversational dialogue. Although not illustrated, the plurality of servers 18(1)-18(*n*) may host and/or manage a plurality of LLMs which may be pre-trained general purpose LLMs or fine-tuned LLMs. The plurality of servers 18(1)-18(*n*) may be a cloud-based server or an on-premises server. The fine-tuned LLM 30 may be accessed using an application programming interface (API) for use in applications. In another example, the fine-tuned LLM 30 may be hosted by the plurality of servers 18(1)-18(*n*) and managed remotely by the filtering computing system 12.

An LLM 30 is a type of artificial intelligence-machine learning (AI/ML) model that is used to process natural language data for tasks such as natural language processing, text mining, text classification, machine translation, question-answering, response generation, or the like. The LLM 30 uses deep learning or neural networks to learn language features from large amounts of data. The LLM 30 is, for example, trained on a dataset and then used to analyze data, generate predictions, project strings into a semantic vector space, or generate features from unseen data. The LLM 30 can be used to generate language features such as word embeddings, part-of-speech tags, named entity recognition, sentiment analysis, or the like. Unlike traditional rule-based NLP systems, the LLM 30 does not rely on pre-defined rules or templates to generate responses.

The LLM 30 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The LLM 30 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, the LLM 30 is configured to generate and/or train a classification model to classify a dataset, consistent with disclosed embodiments.

The filtering computing system 12 may also contain one or more models 30 configured to generate predictions. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. Decision trees may comprise a data structure mapping observations about something, in the "branch" of the tree, to conclusions about that thing's target value, in the "leaves" of the tree. Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the filtering computing system 12 may analyze information applying machine-learning methods.

The communication interface 26 of the filtering computing system 12 operatively couples and communicates between the filtering computing system 12 and the one or more of databases 14(1)-14(*n*), the one or more of the client devices 16(1)-16(*n*), and the one or more servers 18(1)-18(*n*), although other types and/or numbers of connections and/or communication networks can be used.

While the filtering computing system 12 is illustrated in this example as including a single device, the filtering computing system 12 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the filtering computing system 12.

Additionally, one or more of the devices that together comprise the filtering computing system 12 in other examples can be standalone devices or integrated with one or more other devices or apparatuses, such as in one of the server devices or in one or more computing devices for example. Moreover, one or more of the devices of the filtering computing system 12 in these examples can be in a same or a different communication network including one or more public, private, or cloud networks, for example.

Although an exemplary filtering computing system 12 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in this filtering computing system 12, such as the filtering computing system 12, for example, may be configured to operate as virtual instances on the same physical machine. In other words, by way of example one or more of the filtering computing system 12 may operate on the same physical device rather than as separate devices communicating through communication network(s). Additionally, there may be more or fewer filtering computing system 12 than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to conduct steps necessary to implement the methods of the examples of this technology that are described and illustrated herein.

Figure 2C:
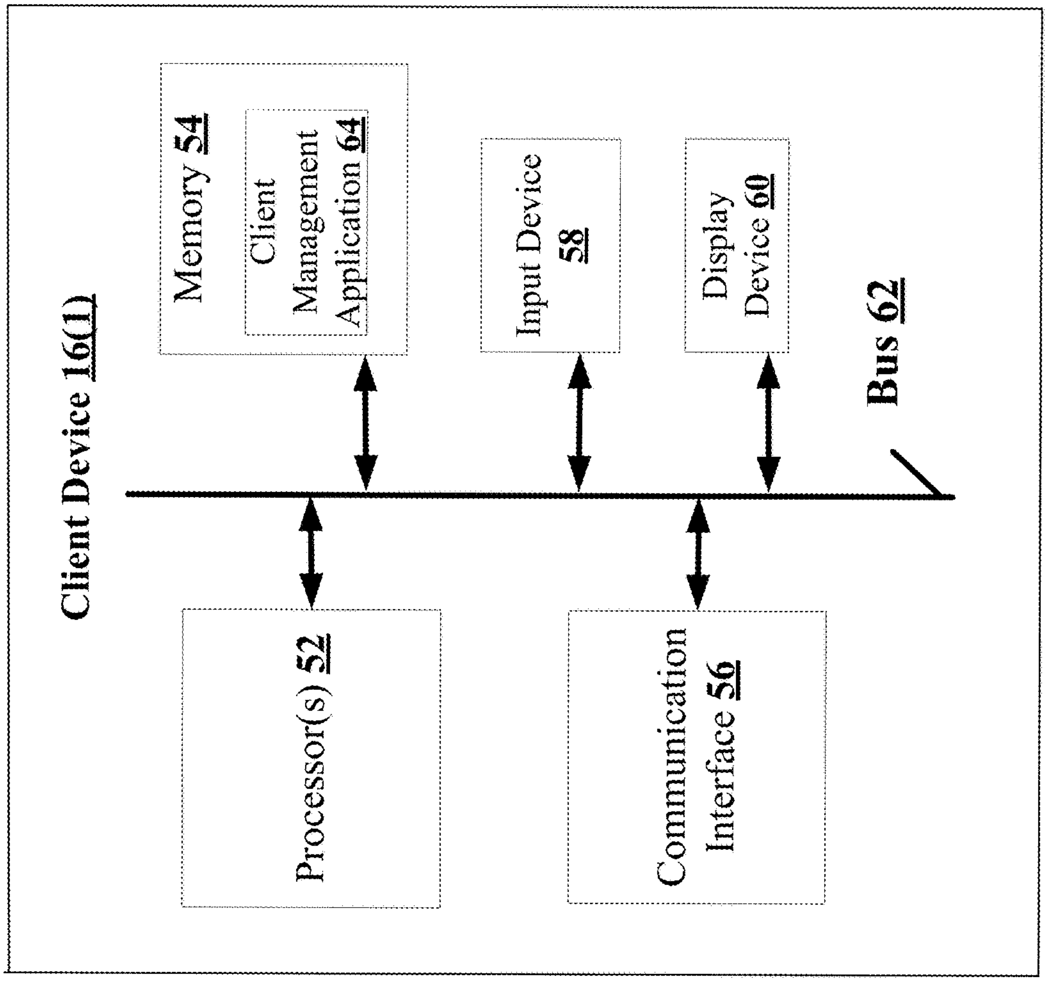
FIG. 2C is a block diagram illustrating an example of an architecture of a client device.
Figure 2B:
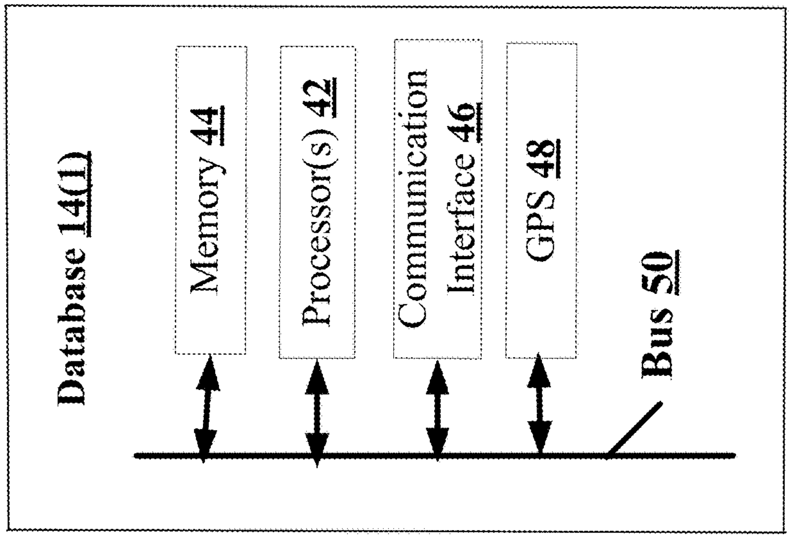
FIG. 2B is a block diagram illustrating an example of an architecture of a database.

Referring to FIGS. 1 and 2B, the plurality of databases 14(1)-14(*n*) may comprise a variety of different types and/or numbers of systems, devices, or other things in the environment 10, such as a variety of different text data or other data or combinations thereof by way of example only. In this example, each of the databases 14(1)-14(*n*) at least have the same following structure and operation as shown in the example of the database 14(1) shown in FIG. 2B, although databases 14(1)-14(*n*) with other types and/or numbers of other systems, devices, components, and/or other elements may be used. Additionally, in this example, the database 14(1) has one or more processors 42, a memory 44, a communication interface, and a global positioning system (GPS) device 48 which are coupled together by a bus or other communication link 50, although each database of data could have other types and/or numbers of systems, devices, components and/or other elements in other configurations.

Referring to FIGS. 1 and 2C, the plurality of client devices 16(1)-16(*n*) in this example includes any type of computing device that can participate in the detection and summation of data in an environment 10 with a client management application 64, such as mobile computing devices, desktop computing devices, laptop computing devices, tablet computing devices, virtual machines (including cloud-based computers), or the like. In this example, each of the client devices 16(1)-16(*n*) at least have the same following structure and operation as shown in the example of the client device 16(1) shown in FIG. 2C, although client devices with other types and/or numbers of other systems, devices, components, and/or other elements may be used. Additionally in this example, the client device 16(1) includes one or more processor 52, a memory 54, a communication interface 56, an input device 58, and a display device 60, which are coupled together by a bus or other communication link 62, types and/or numbers of systems, devices, components, or other elements in other configurations. Additionally, in this example the memory 34 includes a client management application 64 which enables the client 16(1) to interact with the filtering computing system 12 and one or more of the databases 14(1)-14(*n*) as illustrated and described by way of the examples herein, although the memory 54 can include other programmed instructions, modules, applications, or other data for example.

The plurality of servers 18(1)-18(*n*) in this example includes one or more processors, a memory, and a communication interface, which are coupled together by a bus or other communication link, although other numbers and/or types of network devices could be used. In this example, the servers 18(1)-18(*n*) can be located at different locations and may each process requests received from the filtering computing system 12 and/or the client devices 16(1)-16(*n*) via the communication network(s) 20. Various data and other applications may be operating on the filtering computing system 12 and transmitting data (e.g., files or Web pages) to the filtering computing system 12 and/or the client devices 16(1)-16(*n*). The servers 18(1)-18(*n*) may be hardware or software or may represent a system with multiple servers in a pool, which may include internal or external networks.

An exemplary method for detecting and summarizing data using the LLM 30 in the environment 10 with the filtering computing system 12 will now be described with reference to FIGS. 1-4D.

Turning to FIG. 4A-4D, in step 405, the filtering computing system 12 can receive data (i.e., streaming data in FIG. 4A-4D) from a client device (i.e., an edge device) at one of the client devices 16(1)-16(*n*). In some examples, the received data can include traffic data from the client device at one of the client devices 16(1)-16(*n*). Traffic data refers to the information about the data packets that are transmitted and received by the client device at one of the client devices 16(1)-16(*n*) over the network. This can include metrics such as the volume of data transferred, the rate of data transmission, the types of data packets, and the source and destination addresses of the packets. Traffic data is essential for understanding the network behavior and performance of the client device, enabling the system to monitor network utilization, detect anomalies, and optimize data flow.

In some examples, telemetry can be used to collect data from the client device at one of the client devices 16(1)-16(*n*) by using a structured process that begins with data generation. The client devices 16(1)-16(*n*) are equipped with various sensors and components that continuously monitor and record operational metrics, environmental conditions, and performance indicators. Operational data from these sensors and components can include a wide range of information, such as temperature readings, system status updates, error logs, and usage statistics. The software on the client devices 16(1)-16(*n*) can be configured to collect this operational data in real-time, ensuring that all relevant information is captured accurately and promptly. This initial data collection phase of operational and state data is crucial for maintaining an up-to-date and comprehensive view of the state of the client device at one of the client devices 16(1)-16(*n*). The client device at one of the client devices 16(1)-16(*n*) can transmit the operational and state data to the filtering computing system 12. This transmission can occur over various communication channels, such as satellite, cellular networks, Wi-Fi, Ethernet, or specialized IoT networks. The filtering computing system 12 can then filter and summarize the received data as outlined below.

In step 410, the filtering computing system 12 can filter the data using a rule set. As depicted in FIG. 4A-4D, the rule set can include filtering or summation rules. A purpose of the rule set is to detect, summarize, or filter non-essential data, ensuring that only relevant and critical information is transmitted downstream for further processing. In some examples, the rule set may be configured to capture data above a specific threshold, particular system status updates, or the presence of certain error logs. For instance, the rule set might specify that only error logs indicating critical failures are to be retained, while routine informational logs are filtered out. In another instance, the filtering computing system 12 can use the rule set to summarize the received data or drop data from the received data. In a non-limiting example, the filtering computing system 12 can use the rule set to summarize a number of events in the received data or selectively drop (or filter) data that meets predefined criteria specified in the rule set.

Storage of Dropped Data

In step 415, the filtering computing system 12 can store the dropped data (e.g., rollups, the filtered data) in a short-term storage (i.e., a storage buffer). Short-term storage is a temporary holding area for data that is not immediately needed for long-term retention. The hardware used for short-term storage can include high-speed volatile memory such as RAM (Random Access Memory), solid-state drives (SSDs) for faster data access and retrieval, or dedicated cache memory systems. These hardware components are designed to provide quick read/write capabilities and are typically used to store data that needs to be accessed frequently or updated regularly. This storage buffer temporarily holds the data that has been filtered out based on the rule set, allowing for retrospective analysis if certain data becomes important later. The buffer is refreshed at regular time intervals, ensuring that only recent data is retained. In a non-limiting example, in step 420, the filtering computing system 12 can delete old or dated data in the short-term storage in five-minute intervals. The dropped data can be analyzed as described in the steps 425 through 485 below automatically or by user request. As depicted in FIG. 4A-4D, the filtering computing system 12 can also transmit the un-filtered data downstream for processing (explained in greater detail in step 485 of FIG. 4A-4D below and not repeated herein for brevity).

Distributions

The filtering computing system 12 can run the following distribution steps 425 through 440 periodically to send to a database at one of the databases 14(1)-14(*n*) or to a cloud service. In step 425, the filtering computing system 12 can summarize the dropped data in the short-term storage. This summarization process involves using statistical algorithms to aggregate the data, providing a comprehensive snapshot of the information. Techniques such as statistical aggregation, distribution analysis, and histograms are employed to process thousands or even millions of records efficiently. Statistical aggregation involves combining multiple data points in the dropped data to produce summary statistics, such as mean, median, and standard deviation, which offer insights into the central tendency and variability of the data. Distribution analysis examines the frequency and pattern of data points across different ranges in the dropped data, helping to identify trends and anomalies. Histograms graphically represent the distribution of data by grouping data points into bins or intervals, allowing for a visual interpretation of the data's spread and concentration. These methods allow the system to generate an aggregate view of the data, which can be used for further analysis. By summarizing the dropped data in this manner, the filtering computing system 12 ensures that it can quickly and effectively identify trends, anomalies, and other significant patterns for analysis.

In a non-limiting example, the filtering computing system 12 can summarize the dropped data by calculating distributions of the dropped data by employing a series of statistical techniques to analyze the frequency and spread of data points. The filtering computing system 12 can calculate, using an algorithm known in the art, key statistical measures, such as the mean, median, mode, variance, and standard deviation, to provide a deeper understanding of the central tendency and dispersion of the dropped data. These distributions can then later be compared to historical data to identify significant deviations or patterns that may indicate underlying issues or trends.

In step 430, the filtering computing system 12 can compare the current distributions of the dropped data to historical distributions of historical dropped data. In non-limiting examples, the filtering computing system 12 can retrieve the historical distributions of the historical dropped data from a database of distributions at one of the databases 14(1)-14(*n*). In step 435, the filtering computing system 12 can also store the current distributions of the dropped data in the database of distributions at one of the databases 14(1)-14(*n*). By storing the current distributions, the system ensures that these distributions can be used in the future as historical distributions for subsequent comparisons. Additionally, by maintaining a comprehensive database of both current and historical distributions, the filtering computing system 12 can continuously refine rules in the rule set. This ongoing refinement process allows the system to improve its ability to detect and respond to significant or abnormal deviations and emerging trends. As new data is collected and analyzed, the system can adjust its filtering criteria based on observed patterns and deviations, thereby enhancing the overall efficiency and effectiveness of data management and analysis.

The filtering computing system 12 can then take the current distributions and compare them to the assumptions that were made for the last version of the rule set that was deployed to the client device at the client devices 16(1)-16(*n*) (i.e., a last state of the rule set for the client device). In a non-limiting example, a certain number of errors and information log lines in a log file can be expected by the filtering computing system 12. The filtering computing system 12 can check whether the current distribution has changed by verifying whether there are more errors in a current log file compared to information log lines. If the distribution is reasonably close to the expected values, the system can ignore the deviation and clear the buffer. However, if there is a significant deviation, the system can take appropriate action to address it (as further described in step 440 of FIG. 4A-4D).

In step 440, the filtering computing system 12 can also determine whether the current distribution of the dropped data deviates above a predetermined threshold from the historical distributions of the historical dropped data. To make this determination, the filtering computing system 12 can employ statistical methods and algorithms to perform a comparative analysis, calculating key statistical measures such as mean, variance, and standard deviation for both the current and historical distributions. The filtering computing system 12 can then use these measures to identify any significant differences or anomalies above a predefined threshold. When the deviation is not above the predetermined threshold, in step 445, the filtering computing system 12 can terminate the process by clearing the short-term storage buffer after a predetermined amount of time (i.e., the time interval) and maintaining the existing rule set. This ensures that only significant deviations trigger further action, thereby optimizing resource utilization and maintaining the efficiency of the data management process.

Prompts

When the deviation is above the predetermined threshold, in step 450, the filtering computing system 12 can generate a prompt including the current distribution of the dropped data and the rule set. The rule set can include deployed rules, undeployed rules, rules that were applied and filtered the dropped data (as outlined in FIG. 4, at 460). The prompt can be designed to include information and context that will aid in modifying and refining the rule set and addressing any detected deviations or anomalies in the data distributions. Technically, the prompt is constructed by compiling the current distribution of the dropped data and the rule set into a structured format that can be easily interpreted by the LLM 30. This involves organizing the data going into the prompt into a coherent sequence, often using JSON or XML formats, and ensuring that all necessary context and metadata are included.

As indicated in step 460, the rule set used to generate the prompt can first be retrieved by the filtering computing system 12 from a database of rules at one of the databases 14(1)-14(*n*). The rule set can be generated using input from users and from an automatic rule generator. The filtering computing system 12 can receive the input from a user at one of the client devices 16(1)-16(*n*). The input can relate to criteria desired by the user for the rule set. Users can create rules for the rule set by specifying criteria in the input that define unwanted data that should be dropped from traffic data or operational data, such as keywords, patterns, or specific data attributes. These criteria are then translated into rules that the filtering computing system 12 can apply.

As depicted in FIG. 4A-4D, an example rule can include a related rule description, rule parameters, and the rule itself. In a non-limiting example, the database of rules might contain a description such as "rule to filter out any processes executed by a specified user on all or a subset of nodes." The parameters for an associated rule of the description could include a list of nodes and a list of users, such as ['ubuntu']. The rule, in this example, could then be defined as user='ubuntu' and node='ALL', indicating that any processes executed by the user 'ubuntu' on all nodes should be filtered out. This structured approach to rule creation allows for precise and flexible filtering criteria, ensuring that the filtering computing system 12 can effectively manage and analyze data based on specific user-defined conditions.

An automatic rule generator can assist in creating these rules by leveraging algorithms to analyze historical data (from the database of rules at one of the databases 14(1)-14(*n*) and from the database of distributions at one of the databases 14(1)-14(*n*)) and identify patterns or anomalies that signify data that should be filtered. The automatic rule generator can then propose rules based on these findings, which users can review and refine. This process ensures that the rules are data-driven and adaptive to changing data patterns. The generated rule set can then be used to generate the prompt as outlined above.

In step 455, the filtering computing system 12 can receive a description from the client device at one of the client devices 16(1)-16(*n*). The description can include an infrastructure description received from the client device at one of the client devices 16(1)-16(*n*). The description can also include concerns of the user at the client device at one of the client devices 16(1)-16(*n*). By providing the description, the user is able to influence the output of the LLM 30 by providing context about the infrastructure of the system or device and specific areas of concern using natural language. For example, the user can describe the infrastructure by detailing the various subsystems in operation, such as databases, web servers, and IoT devices, and indicate which subsystems are of higher priority or concern. The user might express worries about specific subsystems being critical to the operations of the user, while indicating less concern for other subsystems that are less critical. Additionally, the user can provide preferences on how to prioritize the subsystems or rules in the rule set. This detailed description can then be incorporated into the prompt generated by the filtering computing system 12, ensuring that the LLM 30 has comprehensive context to generate more accurate and effective rule sets tailored to the specific operational needs and concerns of the users.

An example of this process might involve a rule where the user initially indicates that they do not care about certain types of nodes. In this non-limiting example, the filtering computing system 12 can alert the user that a node X is misbehaving. The user may know what node X is configured to do and may update their preferences to focus more granularly on the misbehaving node X. The rules can be prioritized based on the preferences of the user and can include both deployed and undeployed rules. The LLM 30 can create new rules or adjust existing ones to tailor the predetermined criteria based on the observed differences of the nodes or user preferences, ensuring that the system remains responsive to changing conditions and user priorities.

In another example, as depicted in FIGS. 4A-4D, a concern from a user can include that the data on a database node 93 can be exfiltrated. Additionally, the user can include information in the description highlighting that node 1236 is a honeypot and is expected to be attacked regularly and should therefore be ignored (and either filtered or unfiltered). By providing such detailed descriptions, the user can ensure that the filtering computing system 12 and the LLM 30 are aware of the specific roles and expected behaviors of different nodes within the network. This allows the filtering computing system 12 to apply more nuanced and context-aware filtering rules. For instance, the filtering computing system 12 can prioritize monitoring and protecting the database node 93 against potential data exfiltration while filtering data related to alerts from the honeypot node 1236, which is designed to attract and log malicious activity. This targeted approach helps in optimizing resource allocation and ensures that critical threats are addressed promptly while reducing noise from expected and benign activities.

In a non-limiting example, as depicted in FIG. 4A-4D at step 450, a filtering computing system 12 can provide a prompt to the LLM 30 that includes the following components: the historical distributions of historical dropped data representing normal patterns, the current distribution representing an anomalous distribution, the rules set including a list of rules that filtered the received data, and a state of each rule in the rule set (indicating whether they are enabled/deployed or disabled/undeployed). The LLM 30 is then tasked with generating a list of recommendations for adding new rules, deploying unused rules with new parameters, modifying currently deployed rules, or creating new rules to ensure that only data from the anomalous source is unfiltered. The prompt can also include a breakdown of a number of events related to various factors in the data, such as by node or by process, and emphasizes that any new rules should not significantly increase the volume of data that will be sent for downstream processing in the cloud.

In step 475, the filtering computing system 12 can provide the prompt to the large language model (LLM) 30. The LLM 30 can be configured to analyze the prompt to generate recommendations for modifying, adding, or removing rules in the rule set. The LLM 30 can be configured to aim to generate new rules or reconfigure or remove currently deployed rules such that when new streaming data is received from the client device at one of the client devices 16(1)-16(*n*), a modified rule set can capture only the discrepancies detected in the distribution without overwhelming the filtering computing system 12 with additional volume. This innovative approach reduces the load on security engineers by allowing the LLM 30 to make decisions on what rules should be in the rule set and what data should be filtered or dropped.

Modified Rule Sets

In step 480, the filtering computing system 12 can receive a modified rule set from the LLM 30. The modified rule set can include new rules, adjustments to existing rules, or the removal (or disablement) of rules. Once received, the filtering computing system 12 can apply the modified rule set to reprocess the data in the short-term storage buffer, ensuring that only the most relevant and critical data is retained or sent downstream for processing (as described further below in step 485 of FIG. 4A-4D). Any data that does not meet the updated criteria in the rule set is dropped, optimizing the data management process.

Iterative Process and Downstream Processing

In step 485, the filtering computing system 12 can provide non-filtered data (i.e., retained data or data that was not filtered out by the rule set) to a cloud service or another downstream processing system. This downstream processing can involve several advanced data analytics tasks, such as machine learning model 30 training, real-time monitoring, and predictive analytics. By leveraging the computational power and scalability of cloud services, the filtering computing system 12 can handle large volumes of data efficiently and perform complex analyses that might be impractical on local devices such as at the client devices 16(1)-16(*n*). While the cloud services can manage large volumes of data, the volume of the streaming data from client devices 16(1)-16(*n*) can become quite large. Thus, filtering the operational and traffic data before it is sent to the cloud service is beneficial because it reduces the volume of data that needs to be transmitted and processed, thereby lowering bandwidth usage and associated costs. It also ensures that only relevant and critical information is analyzed, which enhances the efficiency and effectiveness of the cloud-based processing and analytics tasks. This selective filtering using a dynamic rule set generated using a LLM 30 helps optimize resource utilization and ensures that the cloud service can focus on processing the most valuable data, leading to more accurate and actionable insights.

Once the data is in the cloud, it can be processed using various tools and platforms designed for big data analytics. For instance, the data can be ingested into data lakes or warehouses, where it is cleaned, transformed, and stored for long-term analysis. Machine learning algorithms can be applied to detect patterns, predict future trends, and identify potential issues before they become critical. Additionally, real-time dashboards and visualization tools can be used to present the data in an accessible format, allowing users to make informed decisions quickly. Alerts and notifications can be set up to trigger when certain thresholds are met, enabling proactive management and maintenance of the network. The cloud service can aggregate data from multiple client devices 16(1)-16(*n*) (e.g., edge devices), providing a holistic view of the entire network's performance and health. By processing data downstream in a cloud service, organizations can achieve greater insights, enhanced operational efficiency, and improved decision-making capabilities.

The flow outlined in FIG. 4A-4D is an iterative process that repeats dynamically as situations arise or change, ensuring that the system remains responsive to new data patterns and operational conditions. As new data is collected and analyzed, the filtering computing system 12 can continuously refine the rule set, leveraging the LLM 30 to adapt to evolving requirements and maintain optimal performance.

Figure 3:
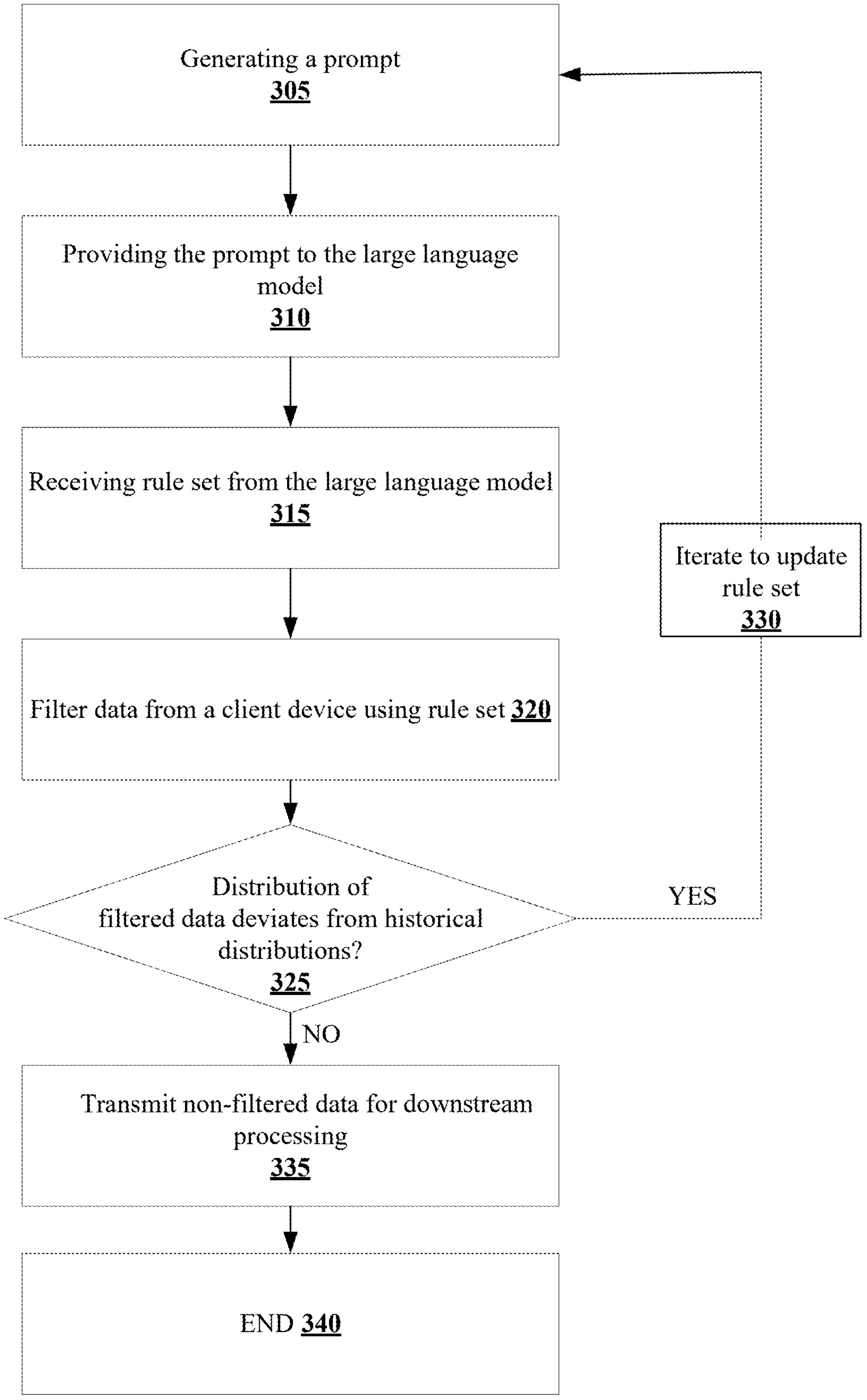
FIG. 3 is an exemplary flowchart of an exemplary method of detecting repetitive data.

Turning to FIG. 3, FIG. 3 is a flow diagram illustrating an exemplary method 300, in accordance with certain embodiments of the disclosed technology. The steps of method 300 may be performed by one or more components of the filtering computing system 12.

Method 300 of FIG. 3 is similar to the flow of FIG. 4A-4D. In step 305, the filtering computing system 12 may generate a prompt as outlined in the descriptions of steps 405 through 470 in FIG. 4A is similar to the description of 305 and are not repeated herein for brevity. Alternatively, the filtering computing system 12 can also generate a prompt using only steps 450 through 470 (the descriptions of 405 through 470 are not repeated herein for brevity.).

In step 310, the filtering computing system 12 may provide the prompt to the LLM 30. The LLM 30 can be configured to analyze the prompt to generate recommendations for modifying, adding, or removing rules in the rule set. The LLM 30 can be configured to aim to generate new rules or reconfigure or remove currently deployed rules such that when new streaming data is received from the client device at one of the client devices 16(1)-16(*n*), a modified rule set can capture only the discrepancies detected in the distribution without overwhelming the filtering computing system 12 with additional volume. This innovative approach reduces the load on security engineers by allowing the LLM 30 to make decisions on what rules should be in the rule set and what data should be filtered or dropped.

In step 315, the filtering computing system 12 may receive, from the LLM 30, a rule set. The rule set from the LLM 30 can include rules for filtering streaming data or data from a client device at one of the client devices 16(1)-16(*n*). In other examples, the rule set can be a modified rule set as described in step 480 in FIG. 4A-4D. Once received, the filtering computing system 12 can apply the rule set or the modified rule set to received data or data in the short term storage buffer, ensuring that only the most relevant and critical data is retained or sent downstream for processing. Any data that does not meet the updated criteria in the rule set is dropped, optimizing the data management process.

In step 320, the filtering computing system 12 may filter data from a client device at one of the client devices 16(1)-16(*n*) using the rule set as described in step 410 of FIG. 4A-4D. In step 325, the filtering computing system 12 may determine whether a distribution of the filtered data deviates from historical distributions of historically filtered data as described in steps 425 through 440 of FIG. 4A-4D. When the filtering computing system 12 determines that the distribution of the filtered data deviates from the historical distributions, in step 330, the filtering computing system 12 may iterate through steps 305 to 325 of FIG. 3 to update or modify the rule set. In step 335, the filtering computing system 12 may provide (or transmit) non-filtered data for downstream processing as described in step 485 of FIG. 4A-4D. In step 340, the process may terminate.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A method for detecting and summarizing data, the method implemented by a network traffic management system comprising one or more network traffic apparatuses, client devices, or server devices, the method comprising:

determining whether current distributions of dropped data from a client device conform with historical trends;

in response to determining the current distributions of the dropped data do not conform with historical trends, providing, to a large language model, a prompt, wherein the large language model is configured to modify a rule set based on the prompt and wherein the prompt is generated using rules and distributions;

filtering data of the client device using the modified rule set, wherein the modified rule set is received from the large language model; and providing the filtered data to a service for downstream processing.

2. The method as set forth in claim 1, wherein determining whether the current distributions of the dropped data conform with the historical trends further comprise:

storing the dropped data in a short-term storage;

determining whether there is a deviation above a predetermined threshold between the current distributions of the dropped data from the short-term storage and historical distributions of historical dropped data by comparing the current distributions of the dropped data to the historical distributions of the historical dropped data; and in response to determining the deviation is above the predetermined threshold, providing, to the large language model, the prompt.

3. The method as set forth in claim 2, wherein the rules comprise deployed rules in the rule set, undeployed rules in the rule set, and applied rules from the rule set that filtered out the dropped data received from the client device, and wherein the distributions comprise the historical distributions of the dropped data and the current distributions of the dropped data.

4. The method as set forth in claim 2, wherein the large language model is configured to modify the rule set by generating a new rule, reconfiguring a rule in the rule set, or removing a rule from the rule set.

5. The method as set forth in claim 2, wherein the prompt further comprises a description comprising infrastructure of the client device and user preferences, and wherein the modified rule set generated by the large language model is based on the description of the infrastructure of the client device and conforms with the user preferences.

6. A non-transitory computer readable medium having stored thereon instructions for detecting and summarizing data comprising executable code which when executed by one or more processors, causes the processors to:

determine whether current distributions of dropped data from a client device conform with historical trends;

in response to determining the current distributions of the dropped data do not conform with historical trends, provide, to a large language model, a prompt, wherein the large language model is configured to modify a rule set based on the prompt and wherein the prompt is generated using rules and distributions;

filter data of the client device using the modified rule set, wherein the modified rule set is received from the large language model; and provide the filtered data to a service for downstream processing.

7. The non-transitory computer readable medium as set forth in claim 6, wherein determining whether the current distributions of the dropped data conform with the historical trends further comprise: storing the dropped data in a short-term storage; determining whether there is a deviation above a predetermined threshold between the current distributions of the dropped data from the short-term storage and historical distributions of historical dropped data by comparing the current distributions of the dropped data to the historical distributions of the historical dropped data; and in response to determining the deviation is above the predetermined threshold, providing, to the large language model, the prompt.

8. The non-transitory computer readable medium as set forth in claim 7, wherein the rules comprise deployed rules in the rule set, undeployed rules in the rule set, and applied rules from the rule set that filtered out the dropped data received from the client device, and wherein the distributions comprise the historical distributions of the dropped data and the current distributions of the dropped data.

9. The non-transitory computer readable medium as set forth in claim 7, wherein the large language model is configured to modify the rule set by generating a new rule, reconfiguring a rule in the rule set, or removing a rule from the rule set.

10. The non-transitory computer readable medium as set forth in claim 7, wherein the prompt further comprises a description comprising infrastructure of the client device and user preferences, and wherein the modified rule set generated by the large language model is based on the description of the infrastructure of the client device and conforms with the user preferences.

11. A network traffic manager apparatus, comprising memory comprising programmed instructions stored in the memory and one or more processors configured to be capable of executing the programmed instructions stored in the memory to:

determine whether current distributions of dropped data from a client device conform with historical trends;

in response to determining the current distributions of the dropped data do not conform with historical trends, provide, to a large language model, a prompt, wherein the large language model is configured to modify a rule set based on the prompt and wherein the prompt is generated using rules and distributions;

filter data of the client device using the modified rule set, wherein the modified rule set is received from the large language model; and provide the filtered data to a service for downstream processing.

12. The network traffic manager apparatus as set forth in claim 11, wherein determining whether the current distributions of the dropped data conform with the historical trends further comprise: storing the dropped data in a short-term storage; determining whether there is a deviation above a predetermined threshold between the current distributions of the dropped data from the short-term storage and historical distributions of historical dropped data by comparing the current distributions of the dropped data to the historical distributions of the historical dropped data; and in response to determining the deviation is above the predetermined threshold, providing, to the large language model, the prompt.

13. The network traffic manager apparatus as set forth in claim 12, wherein the rules comprise deployed rules in the rule set, undeployed rules in the rule set, and applied rules from the rule set that filtered out the dropped data received from the client device, and wherein the distributions comprise the historical distributions of the dropped data and the current distributions of the dropped data.

14. The network traffic manager apparatus as set forth in claim 12, wherein the large language model is configured to modify the rule set by generating a new rule, reconfiguring a rule in the rule set, or removing a rule from the rule set.

15. The network traffic manager apparatus as set forth in claim 12, wherein the prompt further comprises a description comprising infrastructure of the client device and user preferences, and wherein the modified rule set generated by the large language model is based on the description of the infrastructure of the client device and conforms with the user preferences.

16. A network traffic management system, comprising one or more traffic management apparatuses, client devices, or server devices, the network traffic management system comprising memory comprising programmed instructions stored thereon and one or more processors configured to be capable of executing the programmed instructions to:

determine whether current distributions of dropped data from a client device conform with historical trends;

in response to determining the current distributions of the dropped data do not conform with historical trends, provide, to a large language model, a prompt, wherein the large language model is configured to modify a rule set based on the prompt and wherein the prompt is generated using rules and distributions;

filter data of the client device using the modified rule set, wherein the modified rule set is received from the large language model; and provide the filtered data to a service for downstream processing.

17. The network traffic management system of claim 16, wherein determining whether the current distributions of the dropped data conform with the historical trends further comprise:

storing the dropped data in a short-term storage;

determining whether there is a deviation above a predetermined threshold between the current distributions of the dropped data from the short-term storage and historical distributions of historical dropped data by comparing the current distributions of the dropped data to the historical distributions of the historical dropped data; and in response to determining the deviation is above the predetermined threshold, providing, to the large language model, the prompt.

18. The network traffic management system of claim 17, wherein the rules comprise deployed rules in the rule set, undeployed rules in the rule set, and applied rules from the rule set that filtered out the dropped data received from the client device, and wherein the distributions comprise the historical distributions of the dropped data and the current distributions of the dropped data.

19. The network traffic management system of claim 17, wherein the large language model is configured to modify the rule set by generating a new rule, reconfiguring a rule in the rule set, or removing a rule from the rule set.

20. The network traffic management system of claim 17, wherein the prompt further comprises a description comprising infrastructure of the client device and user preferences, and wherein the modified rule set generated by the large language model is based on the description of the infrastructure of the client device and conforms with the user preferences.

* * * * *